United States Patent [19]

Kenyon

[11] 4,201,672
[45] May 6, 1980

[54] CAKE DISPLACEMENT MEANS FOR FILTER PRESSES

[75] Inventor: Jack Kenyon, Goostrey, England

[73] Assignee: The Moseley Rubber Co. Ltd., Manchester, England

[21] Appl. No.: 923,120

[22] Filed: Jul. 10, 1978

[30] Foreign Application Priority Data

Sep. 14, 1977 [GB] United Kingdom ............... 38415/77

[51] Int. Cl.² .................... B01D 25/32; B01D 35/16
[52] U.S. Cl. .................................. 210/225; 210/332; 210/409; 210/413
[58] Field of Search ............. 210/66, 67, 79, 81, 210/106, 224, 225, 332, 357, 391, 409, 413; 162/275, 277; 239/225, 587

[56] References Cited

U.S. PATENT DOCUMENTS

| 3,622,005 | 11/1971 | Kurita ........................... 210/225 |
| 3,780,747 | 12/1973 | Stadie et al. .................. 210/225 |
| 4,064,045 | 12/1977 | Schmidt ........................ 210/81 |

FOREIGN PATENT DOCUMENTS

1461005  12/1965  France ..................... 210/225

Primary Examiner—Frank Sever
Attorney, Agent, or Firm—Townsend and Townsend

[57] ABSTRACT

A method and apparatus for the removal of cakes from an open filter press is proposed which involves directing one or more jets of a pressure fluid towards the chamber to impinge on an edge of the cake and/or on the filter cloth adjacent such edge. If desired, the jet or jets are oscillatable so as to sweep across the said edge or the filter cloth adjacent such edge.

9 Claims, 4 Drawing Figures

CAKE DISPLACEMENT MEANS FOR FILTER PRESSES

The invention concerns improvements to filter presses, and has more particular reference to a method of and a means for assisting in the removal of cakes from the press chambers of an open press.

Various means have been proposed for the removal of cakes from the press chambers of an open filter press, including inter alia, threads or a graticule across the face of the filter cloth which, on displacement relative to the cloth, separates the cake from the cloth. Another known arrangement comprises a mechanism connected with the filter cloth which, on actuation, moves the cloth away from the adjacent surface of the cake thus to separate such cloth from the cake.

Whilst the means as aforesaid are widely used, such means do not provide a wholly satisfactory solution to the problem, and the need still remains for an effective means which is of wide application in a variety of circumstances.

According to the present invention there is proposed a method of removing filter cakes from the chambers of an open filter press which includes the step of directing a jet or jets of a pressure fluid into the said chamber and transversely thereof to impinge on an edge of the cake and/or on the filter cloth adjacent such edge.

Preferably, the method will include the further step of vibrating the filter plate, thus to assist in the separation.

The invention also includes a filter press for use in practising the method as aforesaid, such filter press being characterised by a means adapted to apply a jet or jets of a pressure fluid to the edge of a cake present in a press chamber of an open filter press and/or to the filter cloth by which such cake is supported and at a position adjacent such edge.

In a typical example, a single one-half inch diameter nozzle was positioned approximately three inches from the top edge of a cake in an open filter press, and a jet of air from such nozzle was directed at such edge, the air pressure at the nozzle being 120 p.s.i. The cake was satisfactorily separated from the filter cloth, and was discharged, under gravity, from the chamber, the air jet assisting such discharge.

In the case of an automatic press, wherein the plates open automatically and simultaneously on the completion of a press cycle, a nozzle will be provided in respect of each space as existing between and defined by adjacent such plates, and the nozzles will operate simultaneously or sequentially, either during opening of the press or when the same is fully open as preferred. It is thought that the close spacing of the press plates in the open or opening condition of the press will assist in separation of the cake by the air jet having regard to the ,anner in which the pressure air is confined, such pressure air moving along the cake/filter cloth interface thereby to move the cake outwardly relative to the filter cloth. Alternatively, single or multiple nozzles which move longitudinally to service all or selected ones may be provided, such nozzles moving continuously or discontinuously as preferred.

With non-automatic presses wherein the individual plates are separated in succession, a nozzle or nozzles will be provided at one or more specific locations to which or past which each plate is moved, the nozzle or nozzles being operable selectively so as to provide a jet or jets only when the plate is in a requisite disposition relative thereto or being continuously in operation, as preferred. In an alternative arrangement, the nozzle or nozzles will be movably mounted and will be so arranged as to move longitudinally of the press in register with the "open space" as represented by the press chamber for the time being in an open condition.

By providing serrated side bars to the press, the press plates can be caused to vibrate on movement thereof longitudinally of the total press structure, such vibration serving to loosen the cake relative to the cloth and to assist in cake separation, such vibration taking place before or during the application of pressure air.

It is also thought to be advantageous cyclically to vary the air velocity as applied to the cake and/or the filter cloth, and the fluid pressure means may be constructed accordingly.

Whilst we have found that a single jet directed at the edge of the cake as before described satisfactorily separates a cake from the filter cloth, the invention is not limited to the use of a single nozzle, and two or more nozzles may be used, if preferred. In the case of two nozzles, it is proposed that these be positioned symmetrically relative to the center of the top of the cake and be separated by, for example, a distance equal to one-third of the width of such cake. However, other spacings may be preferred in some circumstances. The nozzles will be directed towards the adjacent flange surface, and therefore the cake edge, thus removing the cake and ensuring removal of any solids from the flange surface. In some circumstances, a combination of nozzles providing jets at different angles may be found advantageous. For example, in the case of relatively thin cakes, it is preferred that a multiplicity of nozzles be provided and that such nozzles be angled towards the filter cloth in the region of the cake edge.

The invention will now be described further, by way of example only, with reference to the accompanying diagrammatic drawings illustrating three embodiments thereof and in which.

Figure 1:
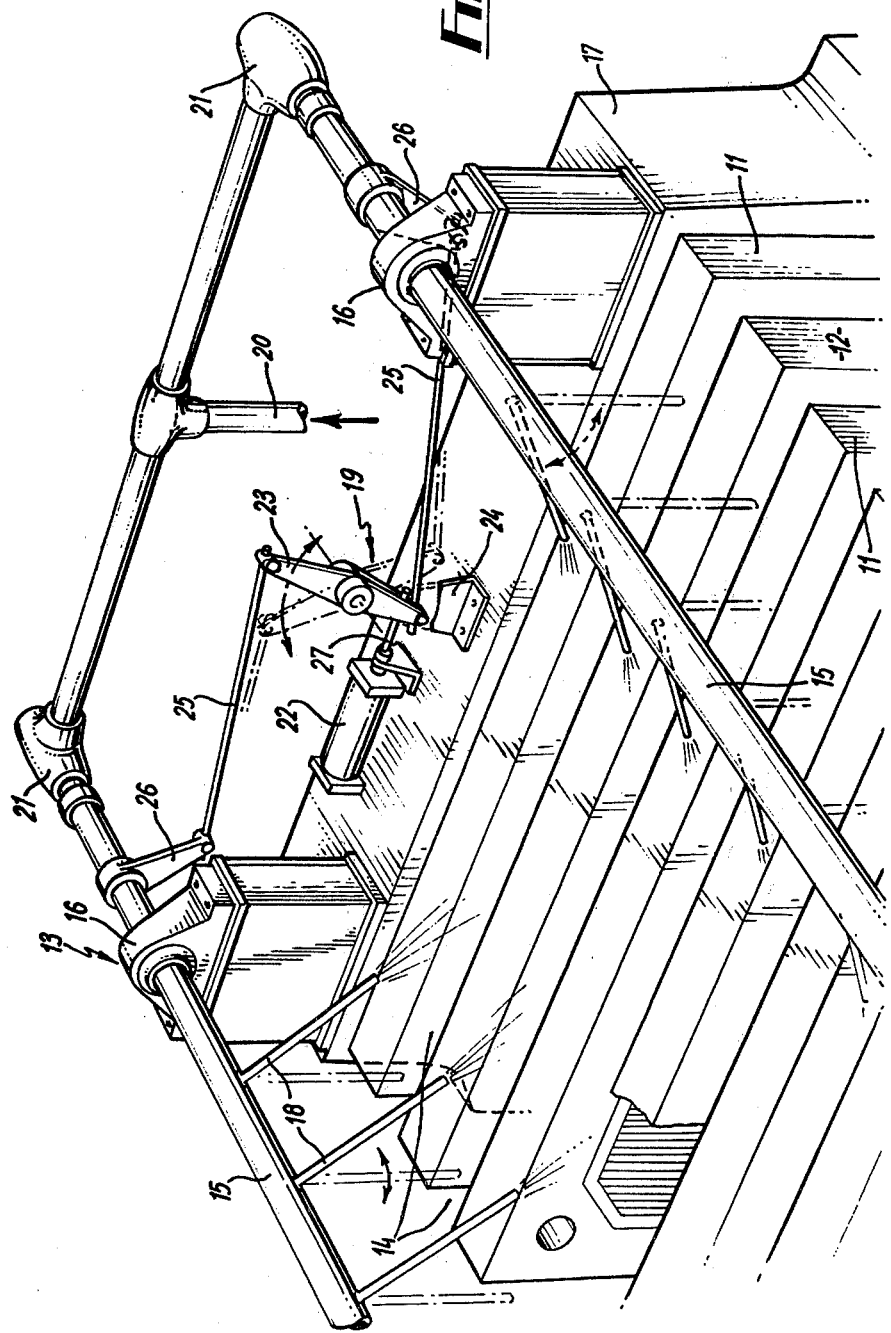
FIG. 1 is a perspective view of one end of a press fitted with a cake separation means constructed in accordance with the invention.
Figure 2:
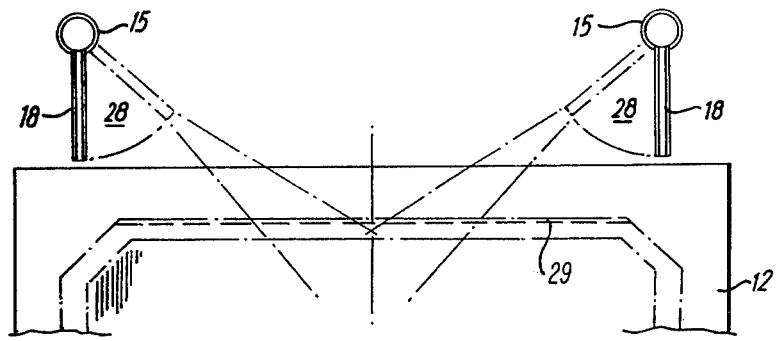
FIG. 2 is a front elevation of a press plate, showing the disposition and arc of movement of the nozzles of FIG. 1 in relation thereto.

Referring now to the drawings, and particularly to FIGS. 1 and 2 thereof, a filter press comprises a plurality of membrane plates 11 and recess plates 12 arranged in alternating disposition longitudinally of the press and is provided with a cake separating means 13 operable to direct multiple jets of air under pressure into the space 14 between adjacent plates 11, 12, in the open condition of the press thus to separate the cake in such space from the filter cloth to which such cake is adhering.

The membrane plates 11 and recess plates 12 have lateral extensions (not shown) whereby such plates are supported on the press side bars (not shown), and are provided with inlet and outlet means (not shown) for the material under processing and the filtrate, respectively, and furthermore include feed passages (not shown) for air under pressure whereby the membranes are displaced to compress the cake and express moisture therefrom prior to opening of the press, all in conventional manner.

The cake separating means 13 of the invention comprises an oscillating nozzle arrangement whereby jets of air under pressure are applied to the top edges of the cakes supported on the filter cloth or to the cake/cloth interface, the arrangement including a respective manifold 15 parallel to and positioned above each longitudinal edge of the press, each such manifold being rotatably mounted in plummer blocks 16 carried by the press end plates 17 (only one of which is shown), and a nozzle 18 on each of the manifolds in register with each space 14 in the open condition of the press, there being a drive means 19 for effecting limited oscillatory motion of the manifolds 15 about the respective axis thereof whereby the nozzles 18 execute a corresponding motion to direct a jet of air across the top of the cake in the press space.

Air under pressure is applied to the manifolds 15 from a fixed inlet manifold 20 through swivel joints 21 which connect manifolds 15 with the inlet manifold 20, whilst the drive means 19 for effecting oscillatory motion of the manifolds 15 (and thus of the nozzles 18) comprises a pneumatic piston and cylinder arrangement 22 connected with the manifolds 15 via a lever 23 pivotally mounted in an upstanding bracket 24 on the press end plate 17, respective connecting rods 25 and drive levers 26.

As will be appreciated, on reciprocation of the piston rod 27 of the piston and cylinder arrangement 22 by suitably energising such arrangement, the manifolds 15 will be caused to oscillate in synchronism about the respective axes thereof, and thus the nozzles 18 will move through respective segments 28 (FIG. 2) to direct a jet of air under pressure at the upper edge of the cake within the limits as defined by the arc of movement of such nozzles. As shown in FIG. 2, the disposition of the nozzles relative to the upper edge of the cake (as represented by line 29) and the angle of oscillation thereof is such that a jet of air under pressure is applied throughout substantially the full extent of the upper edge of the cake.

In a typical example, the fixed inlet manifold is of three inch bore, the rotatable manifolds of two such bore, and the nozzles of one half inch bore, air being fed to the manifolds at 150 p.s.i., and there being a gap of approximately two and one half inches between adjacent plates in the open condition of the press.

Figure 3:
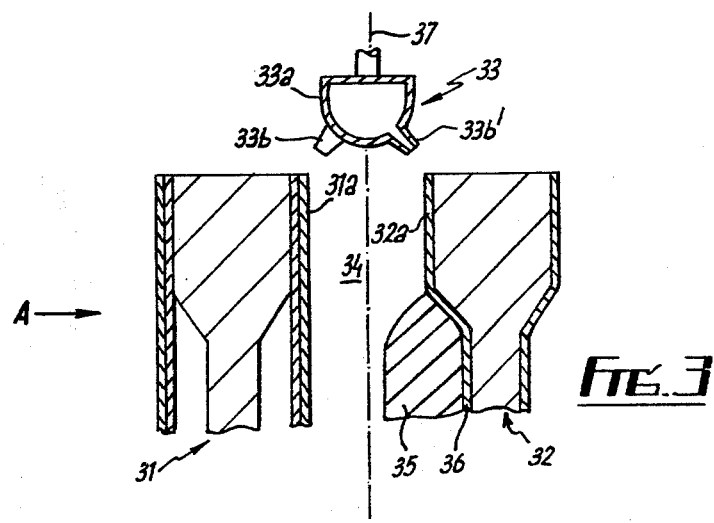
FIG. 3 is a side elevation of two adjacent plates of a filter press comprising alternating membrane and recess plates, the plates being shown in spaced apart disposition, and shows an alternative nozzle arrangement.

In an alternative embodiment, see now FIG. 3, a filter press comprising membrane plates 31, and recess plates 32 arranged in alternating disposition longitudinally of the press is provided with cake removal means 33 operable to direct multiple jets of air under pressure into the space 34 between adjacent plates in the open condition of the press thus to separate the cake 35 located between such plates from the filter cloth 36 to which such cake adheres. The cake removal means 33 comprises a conduit 33a extending across the top of the plate and, having a multiplicity of nozzles 33b, 33b,' thereon, and in fluid flow connection therewith, the nozzles 33b, 33b' alternating axially of the conduit and being oppositely inclined with respect to a plane 37 between the plates and parallel to the opposed faces thereof.

The conduit 33a and the nozzles 33b 33b' extending therefrom are so positioned that the air jets issuing from the nozzles impinge on the plate flanges 31a 32a, thereby to remove any solid materials adhering thereto.

Figure 4:
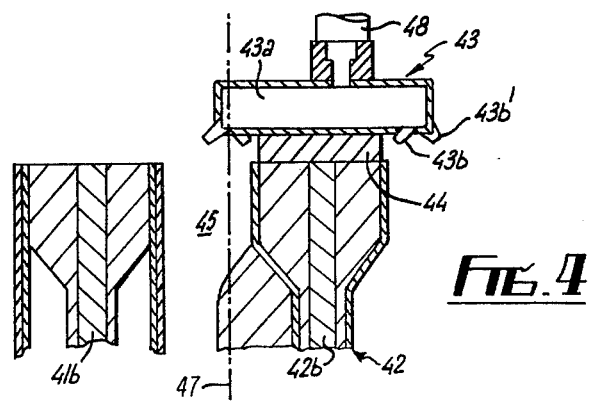
FIG. 4 is a view corresponding to FIG. 3 and shows a cross-section of an alternative embodiment.

In a third embodiment, see now FIG. 4, the cake removal means 43 is mounted on the recess plate 42 and has respective sets of nozzles 43b 43b' operable at the opposite sides of the plate. The means 43 comprises a conduit 43a of rectangular transverse cross-section supported on a spacer 44 mounted on the upper periphery of the plate, the conduit being of greater dimension in the longitudinal direction of the press than the plate upon which the same is supported to extend to a position above the space 45 between adjacent plates 41, 42 in the open condition of the press. As with the embodiment of FIG. 3, the nozzles 43b 43b' alternate longitudinally of the conduit and are oppositely inclined relative to a plane 47 between and parallel to the plates, being directed at the plate flanges, as before. The conduit 43a is connected with a source of air under pressure via a flexible connection 48.

As an alternative to providing respective sets of nozzles directed at the opposed flanges of adjacent press plates, rotatable nozzles may be utilised, as indeed may branched nozzles having multiple outlets respectively directed at the said opposed flanges.

Whilst a nozzle of circular transverse cross-section has been found to be suitable, nozzles of other form may be found advantageous, and thus the invention is to be considered to relate not only to the use of nozzles of circular cross-section but also to nozzles having elongate or other non-circular orifices.

Furthermore, pressures other than the 120 p.si referred to may be utilized.

What is claimed is:

1. A cake displacement means for a filter press including a plurality of generally rectalinearly shaped press plates arranged in successive face-to-face disposition, and movable between a closed condition wherein adjacent press plates are loaded into pressure abutment, and an open condition, wherein adjacent plates are in spaced apart relationship, a press chamber defined by and between successive such press plates, and a filter cloth at each side of the said press chamber, the displacement means comprising at least one axially fixed nozzle mounted generally adjacent an upper edge and entirely outside the periphery of a filter plate in the open condition of the press each nozzle being oriented to direct a respective jet of pressure fluid fed thereto towards the edge of and in a plane generally parallel to a cake formed in a respective chamber and adhering to a filter cloth extending across the face of the plate, means to move said nozzle in said plane so as to direct said jet over the full area of said plate, and a fluid feed means adapted to supply fluid under pressure to each nozzle.

2. A cake displacement means as claimed in claim 1, wherein a plurality of nozzles is provided.

3. A cake displacement means as claimed in claim 2, wherein the nozzles are adapted and arranged for symmetrical disposition relative to the upper edge of the filter plate.

4. A cake displacement means as claimed in claim 1, wherein a nozzle is included which is adapted for oscillatory motion about an axis extending in the longitudinal direction of the press.

5. A cake displacement means as claimed in claim 1, comprising a plurality of pairs of nozzles, a respective pair for each chamber of the press, corresponding nozzles of each pair being mounted on and in fluid flow connection with respective manifolds connected with a source of fluid under pressure.

6. A cake displacement means as claimed in claim 5, wherein the manifolds are rotatably mounted for oscillatory motion about the respective axes thereof, and further including means comprising a piston and cylinder arrangement operable through a connecting rod and linkage system to effect such oscillatory motion.

7. A cake displacement means as claimed in claim 6, wherein the manifolds are arranged in spaced parallel disposition and including rotating couplings connecting the manifolds with a common fixed inlet manifold.

8. A cake displacement means for a filter press, the press including a plurality of serially arranged, generally rectalinearly shaped, adjacent press plates which are movable between a closed position and an open position in which the plates are spaced apart, a press chamber defined between adjacent press plates, and a filter cloth at each side of the press chambers, the cake extending across a face of the plate, adhering to a filter cloth, and being disposed in the chamber, the displacement means comprising at least one axially fixed nozzed for each chamber, means for mounting each nozzle entirely outside, but adjacent the periphery of and generally adjacent the respective edge of a proximate filter plate at a location exterior of such periphery and of the respective chamber, and means for supplying a pressurized fluid to each nozzle, the mounting means including means for moving the nozzle so that pressurized fluid issuing from the nozzle is directed in a plane generally parallel to and over the entire area of said proximate filter plate.

9. A cake displacement means according to claim 8 wherein the mounting means includes means for pivoting each nozzle about an axis disposed exteriorly of the plate peripheries and of the chambers through a limited arc so as to sweep pressurized fluid issuing from the nozzles over said edge of the cake.

* * * * *